May 15, 1962
W. R. WILSON
3,035,112
ELECTRIC BUS
Filed April 19, 1960
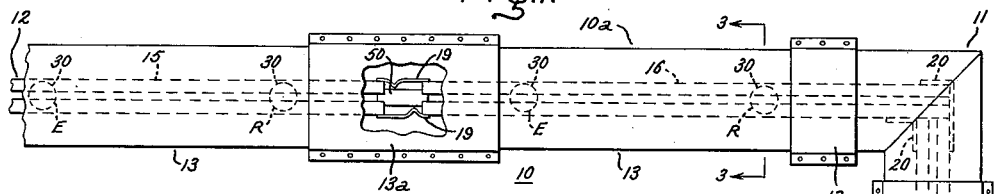
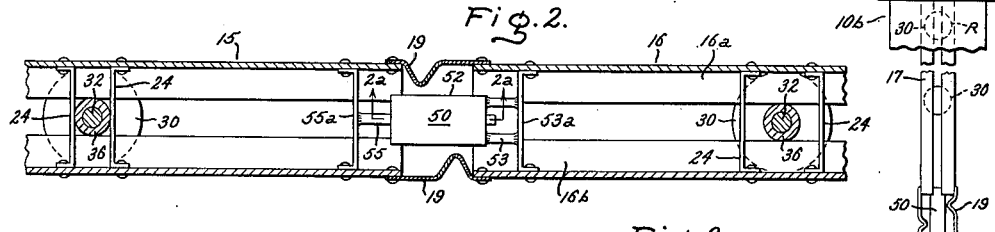
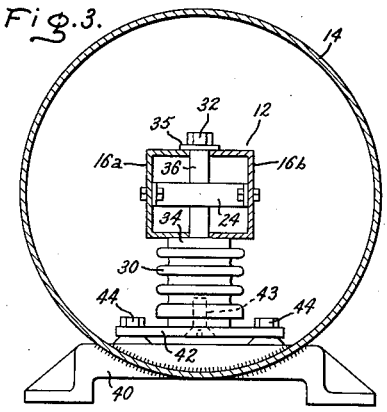
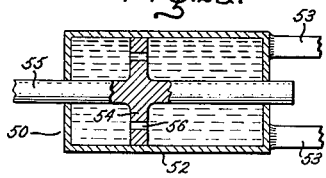
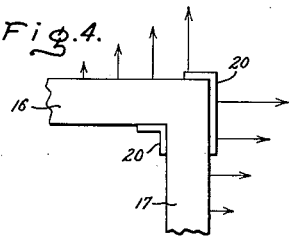
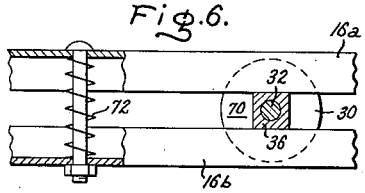
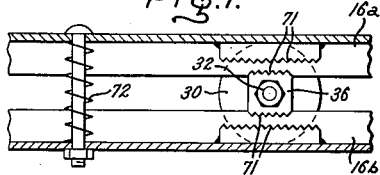
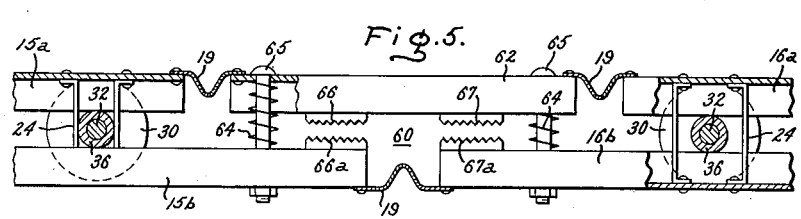
Inventor:
Walter R. Wilson,
by William Freedman
Attorney.

United States Patent Office 3,035,112
Patented May 15, 1962

3,035,112
ELECTRIC BUS
Walter R. Wilson, Wallingford, Pa., assignor to General Electric Company, a corporation of New York
Filed Apr. 19, 1960, Ser. No. 23,205
7 Claims. (Cl. 174—72)

This invention relates to an electric bus of the type that includes interconnected sections joined together at a rigid corner and, particularly, relates to an arrangement for improving the ability of the components of such a bus to withstand the relatively high electromagnetic forces that are concentrated near the corner during short circuit conditions.

In an electric bus that includes a corner, relatively high forces can be developed at the corner during short circuit conditions due to the electromagnetic repulsive forces between the two legs of the bus conductor located at opposite sides of the corner. This can be a rather serious problem, particularly in those buses that include expansion joints for permitting thermally-induced expansion of the bus conductor in a longitudinal direction. This is the case because the usual bus expansion joint is incapable of transmitting certain major components of the forces developed at the corner to the adjacent supporting structure. In this regard, the forces developed at the corner, assuming that the corner is rigid, can have a relatively large component acting longitudinally of the bus conductor, but the usual expansion joint is designed to be incapable of transmitting forces applied in a direction longitudinal of the bus conductor. The result is that substantially all of the longitudinally directed forces applied to a given leg of the bus conductor are borne by the rigid, or non-expansible, supporting joint of that leg and substantially none by the expansion joint of that leg. This concentration of force at a single joint or at a small number of joints increases the likelihood of a mechanical failure and is therefore undesirable.

Accordingly, an object of my invention is to construct the bus in such a manner that the forces developed at the corner under short circuit conditions and applied in a longitudinal direction to a given leg of the bus conductor are borne partially by the expansion joints of that leg. By attaining this object, the rigid joints can be relieved of some of the load resulting from forces developed at the corner, and thus a more uniform distribution of this load over more of the joints of the bus can be effected.

Another object is to construct a bus expansion joint in such a manner that it will allow thermally-induced expansion and contraction of the bus conductor in a longitudinal direction without loading its associated insulator but yet will transmit longitudinally-directed short circuit forces to the insulator.

In carrying out my invention in one form, I provide a bus that comprises a pair of substantially rigid series-connected conductors joined together by means forming a rigid corner connection between the two conductors. An insulating support structure individual to each conductor is provided adjacent the corner connection and each of the conductors is rigidly attached to this insulating support structure. A second insulating support structure longitudinally spaced from the first insulating support structure is also associated with each conductor. Coupling means are provided between each of the conductors and its second support structure which under normal current conditions allows each of the conductors to move longitudinally with respect to the second support structure without applying substantial longitudinally-directed forces to said second insulating support structure. The coupling means is sensitive to current flowing through the conductor and acts in response to short circuit currents to provide a substantially rigid connection between its conductor and the second insulating support structure through which longitudinally-directed forces are transmitted to said second support structure.

For a better understanding of my invention, reference may be had to the following description taken in conjunction with the accompanying drawing, wherein:

FIG. 1 is a plan view partly in section of an isolated phase bus embodying one form of my invention.

FIG. 2 is an enlarged sectional view of a portion of the bus conductor used in the bus of FIG. 1.

FIG. 2a is an enlarged sectional view taken along the line 2a—2a of FIG. 2.

FIG. 3 is a sectional view taken along the line 3—3 of FIG. 1.

FIG. 4 is a plan view of a corner joint illustrating the forces developed thereat during short circuit conditions.

FIG. 5 illustrates a modified embodiment of my invention.

FIG. 6 illustrates still another modified form of my invention.

FIG. 7 illustrates still another modified form of my invention.

Referring now to FIG. 1, there is shown an isolated phase bus 10 comprising two end-to-end connected sections 10a and 10b disposed at right angles with respect to each other and joined together at a corner generally indicated at 11. This bus 10 comprises a bus conductor 12 and a tubular metallic housing 14 of conventional construction surrounding the conductor 12 and spaced therefrom. The disclosed housing 14 preferably comprises a series of tubular sections 13 having their ends joined together in a conventional manner by split covers 13a that can be disassembled to allow for access to the interior of the housing 14. The conductor 12 comprises a plurality of conductive sections 15, 16, 17, and 18 electrically connected together in series circuit relationship. The sections 15 and 16 and the sections 17 and 18 are disposed in aligned end-to-end relationship and are electrically interconnected by means of flexible braids 19 secured between the adjacent spaced-apart ends of the bus sections. The sections 16 and 17 are disposed at right angles to each other and their adjacent ends are electrically and mechanically interconnected by means of a plurality of rigid straps 20 firmly secured to the ends of the sections 16 and 17 to form a rigid corner connection.

Each section of the conductor 12 comprises a pair of channels, such as the channels 16a and 16b shown in FIG. 3. These channels are disposed in laterally spaced-apart relationship with their flanges extending toward the flanges of the adjacent segment so that the cross-section of the composite conductor is of the generally rectangular shape shown in FIG. 3. In the embodiment of FIGS. 1–4 the spacing between the channels is maintained fixed by suitable means, such as spacing straps 24 of channel-form suitably secured between the bodies of the main channels.

The conductor 12 is supported within its housing 14 by means of porcelain insulating posts 30 mounted at longitudinally-spaced stations along the length of the conductor. At each station, there is only a single insulating post 30, and this insulating post is disposed in a plane generally perpendicular to the direction in which short circuit forces between the conductor 12 and adjacent conductors (not shown) would be applied to the conductor 12. Such forces will therefore load the insulating posts 30 in cantilever.

For securing the conductor 12 to each of its insulating posts 30, bolts 32 aligned with the insulators are provided at each insulating station. Each of these bolts 32 is located between the two channel segments of the conductors 12 and is threaded into an end fixture 34 that is integrally united with the upper end of the insulator 30.

When the bolt 32 is tightened, it acts through a suitable washer 35 to clamp conductor 12 to the end fixture 34. A tubular spacer 36 surrounds the shank of the bolt 32 to limit the clamping pressure to the desired value. If the joint is to be an expansion joint that is intended to allow for lengthwise expansion and contraction of the conductor 12, then the straps 24 securing the channels together are located in longitudinally-spaced relationship to the spacing sleeve 36, as is shown, for example at the right hand side of FIG. 2. The spacing between the straps 24 and the sleeve 36 allows the conductor 12 to move in a lengthwise direction without interference between the straps and the spacing sleeve. The clamping pressure exerted by the clamping bolt 32 is insufficient to interfere with the expansion and contraction. For those joints where no longitudinal movement of the conductor 12 relative to its insulator 30 is contemplated, the straps 24 are located closely enough together to remain in engagement with the spacer sleeve 36. Such a joint, which is shown at the left hand side of FIG. 2, is referred to hereinafter as a rigid, or non-expansible, joint.

In the bus of FIG. 1, each section 15, 16, 17, and 18 of the conductor 12 is supported at two spaced-apart insulating stations. The joint between the conductor and the insulator 30 at one of these stations is a rigid joint, whereas the joint between the conductor and the insulator at the other of these stations is an expansible joint. In the bus of FIG. 1, the joints of bus sections 16 and 17 located closest to the corner 11 are rigid joints, designated R, whereas the joints of these bus sections that are more remote from the corner are expansion joints, designated E. Thus, thermal expansion and contraction of the conductor sections 16 and 17 causes the end of each of these sections remote from the corner 11 to change its position slightly, but the right hand end remains generally fixed.

For supporting both the insulator 30 and the duct 14 at each insulator station, a support 40 shown in FIG. 3 is provided at each insulator station. Each of these supports 40 is preferably an aluminum casting extending in a chordal direction across the lower part of the bus housing 14 and fitted into a slot provided in the housing. The housing is attached to the support 40 by suitable means, such as a welded joint provided about the perimeter of the slot. Each insulator 30 is mounted on its support 40 by means of a base plate 42 provided therebetween. Each of these base plates 42 is secured to its insulator 30 by suitable fastening means 43 provided between the base plate and an end fixture on the insulator. The ends of the base plate 42 are clamped to the support 40 by means of suitable bolts 44 extending therethrough.

Each of the base plates 42 preferably has some resilience that permits the conductor 12 to move in a lateral direction under short circuit conditions from its normal position coaxial of the housing 14 toward a zero-force line position slightly displaced therefrom. As is explained in Patent No. 2,892,012, Swerdlow et al., assigned to the assignee of the present invention, this lateral movement limits the loads that would be applied to the insulator as a result of the electromagnetic forces between the conductor 12 and adjacent conductors during short circuit conditions. The base plate 42 has some slight yieldability in a direction axially of the bus conductor, and this permits minor changes in the length of the bus section adjacent the corner joint, as might occur through thermal expansion and contraction.

During the flow of short circuit currents through the conductor 12, relatively high electromagnetic forces can be developed at the corner of the bus due to electromagnetic repulsion between the two legs of the bus conductor located on opposite sides of the corner. Studies of these forces show that they are distributed in the general manner indicated by the arrows of FIG. 4 and act in the general direction of the arrows of FIG. 4. Thus, with a rigid corner joint, a relatively large component of these forces is applied in a direction longitudinal of the bus sections on opposite sides of the corner. If the corner were flexible, on the other hand, no substantial longitudinal forces would be applied to the sections of the bus on opposite sides of the corner, but this apparent advantage would be more than offset by the disadvantages resulting from the much higher transversely-acting magnetic forces that would be applied to the insulators because of the inability of the corner of the conductor itself to withstand forces tending to straighten the corner. The importance of the rigid corner connection will be described in greater detail hereinafter.

In the usual bus construction, the above-described longitudinally-directed force component that is developed at a rigid corner would be borne entirely by those insulators 30 to which the corner conductor sections 16 and 17 are rigidly jointed, i.e., the two insulators 30 nearest the corner. Assuming that the other joints of these bus sections are the usual expansion joints, they would transmit none of this longitudinally-directed force component to their associated insulators 30 inasmuch as the clearance provided therein would render them incapable of transmitting longitudinally-directed force to their insulators. Likewise, in the usual bus the flexible braids provided between the aligned conductive sections, such as 15 and 16, would preclude such loads from being transmitted to the adjacent bus section 15.

In the bus disclosed in FIGS. 1–4, I have relieved the insulators 30 nearest the corner 11 of some of the load to which they would ordinarily be subjected in a rigid-corner bus by providing a dashpot 50 between the bus sections 15 and 16 and another dashpot 50 between the bus sections 17 and 18. Each of these dashpots 50 permits slow motion of the bus sections in a longitudinal direction, such as the slow motion resulting from thermal expansion and contraction, but acts as a substantially rigid mechanical connection supporting tension and compression during a short circuit. In this regard, short circuit forces would be abruptly established and would last for only a very short time, e.g., one-tenth of a second, a period insufficient in duration to permit significant relative movement of the parts of the dashpot.

Referring to FIGS. 2 and 2a, each of these dashpots 50 comprises a cylinder 52 attached to the end of one of the bus sections and a piston 54 attached to the end of a longitudinally-adjacent bus section. In FIG. 2, the cylinder 52 is shown rigidly attached to the bus section 16 through spaced-apart rods 53 attached to a channel 53a secured to bus section 16, whereas the piston 54 is attached to bus section 15 through a piston rod 55 attached to a channel 55a secured to bus section 15. The cylinder 52 is filled with a suitable gas-free dashpot oil, or, alternatively, with a suitable silicone putty. Piston 54 contains a plurality of small metering passageways 56 which allow relatively slow relative movement to occur between the cylinder and piston; thus allowing thermal expansion and contraction of the conductors. Under short circuit conditions, the forces are so abruptly established and are present for such a short time that there is insufficient opportunity for liquid to flow through the metering passages and thus the dashpot acts as a substantially rigid connection between the adjacent sections. When the dashpot 50 is acting as a rigid connection, the bus sections 15 and 16 can be considered as forming a single rigid bus section. Since this composite rigid bus section 15, 16 is rigidly supported at two insulators 30, it will be apparent that longitudinally-directed forces are borne not only by the insulator 30 nearest the corner but also by the other supporting insulator 30 remote from the corner. Thus, the dashpot acts to relieve corner insulator 30 of a substantial portion of the longitudinally-directed load that would otherwise be applied thereto and distributes this load between the corner insulator and another insulator. This reduction in load substantially lessens the chances for a mechanical failure of the corner insulator under extreme short circuit conditions.

It is to be understood that the dashpot 50 between the bus sections 17 and 18 acts in the same general manner as described hereinabove to relieve the corner insulator of bus section 17 from the loads developed at the rigid corner. In the usual bus, other bus sections (not shown) are connected in end-to-end series-circuit relationship with the bus sections shown. It is to be understood that additional dashpots corresponding to dashpots 50 could be provided between the adjacent ends of all of these sections to further distribute the longitudinally directed forces to additional insulators if further reduction in insulator loads are desired.

Another feature of the disclosed bus which contributes toward reducing the loads on the insulators 30 is the rigidity of the corner connection between bus sections 16 and 17. Because this corner connection is rigid, a portion of the longitudinally-directed forces applied to bus section 16 will be borne by the bus section 17 as a force tending to bend the bus section 17 in the direction indicated by the horizontal arrows of FIG. 4. Similarly, a portion of the longitudinally directed forces applied to bus section 17 will be borne by the bus section 16 as a force tending to bend the bus section in the direction of the arrows indicated by the vertical lines of FIG. 4. Thus, the total force on the corner shares its reaction between insulator support stresses and mechanical stresses in the rigid structure of the bus conductor itself. If the corner joint were flexible instead of rigid, it would permit little or none of this sharing, and the forces developed at the corner would be borne solely by the insulators rather than by the combination of the insulators and the rigid structure of bus structure itself.

In the modified form of my invention shown in FIG. 5, a coupling device 60 is substituted for the dash-pots 50 of FIGS. 1–3. This coupling device 60 comprises a conductive coupling member 62 that spans the space between the ends of adjacent conductor sections such as 15 and 16. One of the channel segments of each conductor section is shorter than its mating segment so as to provide space for accommodating the coupling member 62. Flexible braids electrically interconnect the ends of the coupling member 62 and the adjacent conductor sections 15 and 16 so that a portion of the current flowing through the bus flows through the coupling means member 62. Additional flexible braids 19 directly interconnect the longer segments of conductor sections 15 and 16 so that a portion of the current flows through the longer segments. The coupling member 62 is normally maintained in laterally-spaced apart relationship to the longer segments 15b and 16b by means of compression springs 64 urging the coupling member 62 laterally away from the longer segments. Suitable laterally extending bolts 65 slidably received in openings provided in the coupling member 62 limit the spacing to a suitable maximum value.

Under normal current conditions, the electromagnetic forces tending to attract the coupling means 62 to the segments 15b and 16b is insufficient to overcome the separating effect of springs 64. Under short circuit conditions, however, these forces of attraction abruptly increase, and act to drive the coupling member 62 into engagement with the segments 15b and 16b. When these parts are in engagement suitable teeth 66 attached to segment 62 mesh with teeth 66a attached to segment 15b and suitable teeth 67 attached to coupling member 62 mesh with teeth 67a attached to segment 16b. This meshing of teeth under the influence of electromagnetic forces of attraction establishes a positive coupling between the segments 15b and 16b through the coupling member 62.

This positive coupling is capable of transmitting longitudinally-directed forces between the bus sections 15 and 16 and thus, in effect, converts the two bus sections into a single rigid bus section. Thus, the rigid insulating joint R of bus section 15 shares the longitudinally-acting loads with the rigid joint R of bus section 16, thus relieving the latter joint of a portion of the load to which it would otherwise be subjected.

Another way of effecting a more uniform distribution of longitudinally-acting forces developed at the corner of the bus is illustrated in FIG. 6, which shows an expansion joint 70 that is sensitive to the magnitude of current flowing in the bus. In this expansion joint, the segments 16a and 16b of the bus section 16 are maintained in spaced-apart relationship by a compression spring 72 that, under normal current conditions, prevents the segments 16a and 16b from firmly engaging a sleeve 36 surrounding the clamping bolt 32. Thus, under normal current conditions the segments 16a and 16b are free to expand and contract longitudinally without interference from the spacer sleeve 36. Under short circuit conditions, however, these electromagnetic forces of attraction between the segments 16a and 16b abruptly increase, quickly overcoming the bias of spring 72 and forcing the segments 16a and 16b into high pressure engagement with the spacing sleeve. This high pressure engagement establishes a mechanical coupling between the segments 16a, 16b and the spacing sleeve 36 and thus converts the expansion joint into a joint capable of transmitting longitudinally-directed forces to the insulator 30. Thus, the insulator associated with the expansion joint shares a portion of the longitudinally directed load, thereby relieving the corner insulator from some of the load that would otherwise be applied thereto. Preferably, the spacing sleeve 32 is so designed that it has flat sides for engaging the segments 16a and 16b. This helps to increase the effectiveness of the mechanical coupling that is established under short circuit conditions.

In some cases, it might be desirable to provide a more positive coupling between the segments 16a and 16b and the spacing sleeve 36 under short circuit conditions than is the case in FIG. 6. This can be accomplished, as shown in FIG. 7, by providing the spacer sleeve 36 and the segments 16a and 16b with sets of teeth 71 that are adapted to mesh when the segments 16a and 16b are drawn together under short circuit conditions. This meshing relationship provides a more positive connection that facilitates the transmission of longitudinally directed forces to the spacing sleeve 36 and hence to the insulator 30.

In all of the disclosed arrangements that utilize the attractive force between two laterally-adjacent segments for rendering an expansion joint rigid and capable of transmitting longitudinally-directed forces, the lateral spacing between the parts is made as small as practical, and the springs and masses of the parts are so designed that the laterally-adjacent segments are in firm engagement before appreciable longitudinal motion of the bus section has occurred during short circuit conditions.

While I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. An electric bus comprising a first substantially rigid conductor, a second substantially rigid conductor extending transversely of said first conductor and electrically connected in series therewith, means for rigidly interconnecting said two conductors to form a substantially rigid corner joint between said two conductors, a pair of insulating support structures for each of said conductors located at spaced-apart positions along the length of each of said conductors for supporting said conductors, means for rigidly securing each of said conductors to its respective insulating structure located nearest said corner joint, an expansion joint between each of said conductors and the other of its insulating supporting structures for mounting each of said conductors on said other insulating supporting structure in such a manner as to permit said conductor to expand and contact in a longitudinal direction without interference from said other insulating support structure during normal current conditions, said expansion joint including means responsive to the flow of short circuit currents through said conductors to substantially prevent longitudinal movement of said conductors relative to said other insulating supporting structures and to transmit longitudinally-acting forces to said other insulating supporting structures during short circuit conditions.

2. The bus of claim 1 in which at least one of said conductors comprises a pair of laterally-spaced segments and in which the expansion of said one conductor transmits substantially longitudinally-directed forces to said other insulating supporting structure of said one conductor only when said segments are urged together with a force exceeding a predetermined value, means responsive to short circuit currents through said one conductor to urge said segments together with a force in excess of said predetermined value.

3. An electric bus comprising a first substantially rigid conductor, a second substantially rigid conductor extending transversely of said first conductor and electrically connected in series therewith, means for rigidly interconnecting said two conductors to form a substantially rigid corner joint therebetween, an insulating supporting structure individual to each of said conductors and located adjacent said corner joint for supporting one of said conductors, means for rigidly securing each of said conductors to its respective insulating supporting structure, a second insulating supporting structure associated with each of said conductors and longitudinally-spaced from said first supporting structure, means for allowing each of said conductors to move longitudinally relative to said second insulating supporting structure under normal current conditions without applying substantial longitudinally-directed loads to said second insulating supporting structure, and coupling means responsive to short circuit current flowing through said conductors for providing a substantially rigid connection between at least one of said conductors and its second insulating structure through which longitudinally-directed forces are transmitted to said second insulating supporting structure.

4. The bus of claim 3 in which said coupling means comprises a pair of laterally-spaced parts that are arranged for relative movement toward each other when the current through said conductors reaches short circuit values, means responsive to said movement of said laterally-spaced parts toward each other for rendering the connection between said one conductor and said second insulating support capable of transmitting longitudinally-directed forces to said second insulating support.

5. An electric bus comprising first and second substantially rigid conductors disposed in aligned end-to-end relationship, a third conductor extending transversely to said second conductor and electrically connected in series therewith, means for rigidly interconnecting said second and third conductors to form a substantially rigid corner joint therebetween, a pair of insulating supporting structures for each of said conductors located at spaced-apart positions along the length of each of said conductors for supporting said conductors, means for rigidly securing each of said conductors to one of its two insulating support structures, a flexible joint between said first and second conductors for allowing independent thermal expansion and contraction of said first and second conductors relative to each other, coupling means between said first and second conductors ineffective under normal current conditions to transmit longitudinally-directed forces between said first and second conductors, said coupling means including means responsive to flow of short circuit currents through said conductors for rendering said coupling means effective to transmit longitudinally-directed forces between said first and second conductors.

6. The bus of claim 5 in which said coupling means comprises a dashpot that permits slow motion between said first and second conductors under normal current conditions but transmits longitudinally-directed forces between said conductors during short circuit conditions.

7. The bus of claim 5 in which said coupling means comprises a pair of laterally-spaced parts that are arranged for relative movement toward each other when the current through said conductors reaches short circuit values, means responsive to said movement of said laterally-spaced parts toward each other for rendering said coupling means capable of transmitting laterally-directed forces between said first and second conductors.

References Cited in the file of this patent
UNITED STATES PATENTS

| | | |
|---|---|---|
| 2,420,276 | Wood | May 6, 1947 |
| 2,892,012 | Swerdlow et al. | June 23, 1959 |